United States Patent
Schad et al.

(10) Patent No.: US 7,005,462 B2
(45) Date of Patent: Feb. 28, 2006

(54) POLYMER GROUT COMPOSITIONS

(75) Inventors: Gregory W. Schad, Cary, IL (US); Vanda I. Wolinsky, Chicago, IL (US); Bronwyn T. Miller, Belvidere, IL (US)

(73) Assignee: Specialty Construction Brands, Inc., St. Paul, MN (US)

( * ) Notice: Subject to any disclaimer, the term of this patent is extended or adjusted under 35 U.S.C. 154(b) by 27 days.

(21) Appl. No.: 10/729,116

(22) Filed: Dec. 5, 2003

(65) Prior Publication Data

US 2005/0124735 A1 Jun. 9, 2005

(51) Int. Cl.
 *C06K 3/00* (2006.01)
(52) U.S. Cl. .......................... 524/3; 524/547
(58) Field of Classification Search .................. 524/3, 524/547
See application file for complete search history.

(56) References Cited

U.S. PATENT DOCUMENTS

| | | | | |
|---|---|---|---|---|
| 2,821,521 A | * | 1/1958 | Price | 526/304 |
| 3,001,974 A | * | 9/1961 | Frazza | 526/298 |
| 3,557,038 A | * | 1/1971 | Gebura | 523/209 |
| 4,347,174 A | * | 8/1982 | Nagase et al. | 523/116 |
| 4,696,698 A | | 9/1987 | Harriett | |
| 4,696,699 A | | 9/1987 | Harriett | |
| 4,797,158 A | | 1/1989 | Harriett | |
| 4,886,550 A | | 12/1989 | Alexander | |
| 5,476,142 A | | 12/1995 | Kajita | |
| 5,482,004 A | * | 1/1996 | Chowdhury | 119/14.52 |
| 5,569,696 A | | 10/1996 | Abramson et al. | |
| 5,702,828 A | * | 12/1997 | Adler et al. | 428/540 |
| 5,994,428 A | * | 11/1999 | Lutz et al. | 523/201 |
| 6,429,239 B1 | * | 8/2002 | Eck et al. | 524/5 |
| 6,448,317 B1 | | 9/2002 | Kaiser et al. | |
| 6,537,366 B1 | * | 3/2003 | Supplee, Sr. | 106/712 |
| 6,730,722 B1 | * | 5/2004 | Eck et al. | 524/3 |

FOREIGN PATENT DOCUMENTS

| | | |
|---|---|---|
| DE | 38 26 877 A1 | 2/1990 |
| EP | 0 857 772 | 8/1998 |
| WO | WO 97/15603 | 5/1997 |
| WO | WO 01/77242 | 10/2001 |
| WO | WO 2004/031094 | 4/2004 |

* cited by examiner

Primary Examiner—Bernard Lipman

(57) ABSTRACT

Novel, one-part polymer grout compositions are provided comprising a silanated polymer. The inventive grout compositions can thus be water and/or stain resistant to a greater degree than conventional one-part polymer grouts. In some embodiments, the grout compositions may also have enhanced shrinkage and/or crack resistance, as may be provided at least in part by the inclusion of an amount of one or more fiber fillers. As a result of these advantageous properties, the one-part polymer grout compositions provided herein may find applicability in environments previously contraindicated for conventional one-part polymer grout compositions, e.g., in horizontal and/or damp, or even wet, environments, or in combination with certain tile materials, e.g. water absorbing tile materials.

16 Claims, No Drawings

POLYMER GROUT COMPOSITIONS

FIELD OF THE INVENTION

The present invention relates to novel, one-part polymer grout compositions that exhibit a variety of advantageous properties due at least in part to the inclusion therein of a silanated polymer. More particularly, the present grout compositions can be water resistant and stain resistant and in certain embodiments, even shrink and/or crack resistant so as to be suitable for use in horizontal applications, in damp or even wet, environments.

BACKGROUND OF THE INVENTION

The construction industry has shown incredible resilience, if not dynamic growth at times, for the past decade. As the industry has grown, so has the demand for a greater variety and improved quality of construction products and materials. Further, as more relatively untrained individuals are willing to attempt certain building, remodeling or improvement tasks, the demand for greater accessibility to, and enhanced convenience of using these products has also increased.

Tile installation projects are but one example of a construction project that many individuals are willing to attempt with little or no experience or training. While certainly not simple, the average tile project can be completed in a matter of days. Further, the tools and supplies required to do so are readily available for purchase, and in fact, many alternatives are available. For example, there are at least four different types of commercially available grout that may be used to fill the joints between placed tiles, i.e., cement grout, polymer-modified cement grout, two-part polymer grout, and one-part polymer grout.

Of these, one-part polymer grout is the only one that offers the convenience of being available in a pre-mixed state. That is, whereas one-part polymer grout hardens upon drying, the other types of grouts cure upon the addition of water, or in the instance of two-part polymer grout, upon the combination of the two parts. As such, these grouts must be mixed at the time of use and, once mixed, must be used quickly prior to cure. Any unused amounts cannot be reconstituted.

Although one-part polymer grouts thus provide a significant convenience to tile installers, those currently in the marketplace may not be suitable for use in all applications. First, many commercially available one-part polymer grouts are not sufficiently water resistant for use in extremely wet environments, such as e.g., the surfaces of a shower or bathroom or kitchen floors. Even when used in only moderately moist environments, one-part polymer grouts may be susceptible to staining, as may be caused by mold or other microbial infestation or growth, as could certainly occur absent the application of a sealer on top of the hardened grout. However, the application of sealer represents and an additional time requirement, which may be undesirable to those seeking the convenience otherwise offered by one-part polymer grout. Finally, and due at least in part to the fact that these grouts harden though moisture loss, conventional one-part polymer grouts can be susceptible to shrinkage or cracking, further potentially limiting their applicability to drier environments or to uses with tile that does not absorb substantial amounts of water itself, such as porcelain tile.

Desirably, one-part polymer grout compositions would be available that would be suitable for use in a wider variety of applications, i.e., whether horizontal, vertical, load-bearing, moist, wet, etc. Whatever the application, one-part polymer grouts could be improved if they could be provided with stain resistance, advantageously to a degree such that application of a sealer over the applied grout could be avoided.

SUMMARY OF THE INVENTION

The present invention relates to novel one-part polymer grout compositions that can be substantially water and/or stain resistant. Surprisingly, the grout compositions are also very strong, capable of meeting or even exceeding strength standards for cement grouts. In some embodiments, the grout compositions may further be substantially resistant to shrinkage and/or cracking, even when applied in joint spaces up to ¼" wide, and in yet other embodiments may be tintable by any standard paint tinting equipment. As a result of these advantageous properties, the present grout compositions may be utilized in a greater number of environments than conventional one-part polymer grouts while also providing enhanced convenience in any such use.

In a first aspect then, the present invention provides a one-part polymer grout comprising a silanated polymer in an amount effective to render the dried grout water and/or stain resistant. In certain embodiments, the silanated polymer may desirably be a silanated acrylic latex, or in some embodiments, may be a silanated styrene acrylic latex. Although the present grout compositions are expected to exhibit at least some degree of resistance to shrinkage and/or cracking, this property of the present grout compositions may be enhanced in embodiments where the same may be desired via the inclusion of amounts of at least one fiber filler. Similarly, the stain resistant aspect of the present grout compositions may also be enhanced via inclusion of one or more antimicrobial agents or stain resistant additives. In those embodiments where the grout composition may desirably be tintable, the grout compositions may further comprise an amount of rheology modifying fillers.

DETAILED DESCRIPTION OF EMBODIMENTS OF THE INVENTION

The embodiments of the present invention described below are not intended to be exhaustive or to limit the invention to the particular embodiments disclosed in the following detailed description. Rather, the embodiments are described so that others skilled in the art can understand the principles and practices of the present invention.

Unless noted otherwise, the following terms and/or phrases, as used herein, have the following meanings. Such terms/phrases may be explained in greater detail later in the specification. The term "grout" is meant to indicate a composition, filled or unfilled, suitable for filling joint spaces between tiles in vertical or horizontal applications, and thus, generally speaking, having a viscosity of at least about, 100,000 cps or about 600,000 cps, or even 1,000,000 cps. The phrase "one-part polymer composition" is meant to indicate a grout composition that hardens, or 'cures', via the evaporation of water, rather than via a chemical reaction between two parts, whether or not one of the two parts is water, as is the case with, e.g., cement. The phrases "sanded grout" and "unsanded grout" are meant to indicate grout compositions that include an amount of sand as a filler, or don't include such an amount, respectively.

The phrase "water-resistant" is meant to indicate a grout composition that meets or exceeds the requirement for standard cement grout provided in American National Standard Specifications ANSI A 118.6 and 118.7, as measured by the method also provided therein. In certain advantageous embodiments, a water-resistant grout composition may advantageously maintain a Shore A hardness value of at least about 50, or 60, or even 75 after being submerged in water for a period of seven days. The phrase "stain resistant" is meant to indicate an averaged score of from about 0 to about 2 as measured according to Ceramic Tile Institute Stain Test CTE-T-72. The phrases "shrink resistant" or "crack resistant" are meant to indicate that no cracking or sinking of the grout composition, visible upon inspection with the naked eye, is seen once a 12"×16" tile installation, with 3/16" minimum grout joints for sanded grout, and an 8"×8" tile installation, with 1/16" minimum grout joints for unsanded grout, has been installed and allowed to dry. The phrase "silanated" is meant to indicate that at least one silane group ($SiR_3$) wherein R can be any alkyl or cycloalkyl group and desirable may be e.g. a methyl, ethyl, propyl, or butyl group has been chemically linked to at least one monomeric unit of a polymer. The phrase "weight percent", and the abbreviation thereof "wt %", are meant to indicate weight percent as based upon the total weight of the grout composition.

The present invention relates to novel one-part grout compositions comprising a silanated polymer that provide several advantages over conventional one-part polymer grout compositions. More particularly, the present grout compositions are surprisingly strong, as well as being substantially water, stain and in certain embodiments shrinkage and/or crack resistant. In fact, even when evaluated using the stringent industry standards for cement grout, the present one-part polymer grout compositions can meet or exceed the strength, water and stain resistance requirements, and further can even achieve a residential installation rating. As a result, the present grout compositions may be utilized in applications wherein the use of conventional one-part polymer grouts had previously been contraindicated. Further, and due at least in part to the shrinkage and/or crack resistance that may advantageously be imparted to the grout compositions in certain embodiments, the present grout compositions may be used with tiles formed from any material. That is, whereas conventional one-part polymer grout compositions may tend to shrink and/or crack when used with tiles made from water absorbing materials, such as clay based tiles, the present grout compositions are expected to be useable with tiles made from any material, with substantially no shrinking or cracking. Rendering the present grout compositions even more useful and advantageous is the fact that, if desired, the present grout compositions may be rendered 'tintable'. That is, in certain embodiments of the present invention, the present grout compositions may surprisingly be tinted with paint tinting agents, according to any color deck, at a point of sale and agitated with standard paint shaking equipment to provide a stable uniformly tinted grout composition.

The present invention thus provides a one-part polymer grout composition comprising a silanated polymer. Any silanated polymer, or dispersion or combination comprising the same, is believed to be capable of providing the present grout compositions with the surprising strength and water and stain resistance described herein, although for certain embodiments it may be advantageous or desirable that the silanated polymer have a minimum film formation temperature of at least about 20° F., or a $T_g$ greater than about 30° F. so that any grout residue that may be present on the tile surface after installation can be cleaned off easily.

One example of a particular class of polymers that may advantageously be employed in the present grout compositions are acrylics and acrylic dispersions, since acrylic latexes/dispersions can tend to be stronger and more water resistant than other types of polymers. Additionally, many silanated acrylic latexes are readily commercially available, such as those commercially available under the trade designations Rhoximat®DS931 (Rhodea North America, Cranbury, N.J.) NX2835 (BASF Inc., Charlotte, N.C.), 13057 (Scott Bader, Northamptonshire, England). Of course, the invention is not so limited, as any known polymer having monomeric units comprising functionality reactive with a silane moiety, $SiR_3$, may be modified to be silanated and then polymerized, according to any methodology known to those of ordinary skill in the art, to provide a silanated polymer in accordance with the present invention. The silanated polymer can comprise a modified acrylic latex.

Those of ordinary skill in the art will be readily capable of determining the appropriate amount of the desired silanated polymer to include in the present grout compositions, and of course, the particular amount utilized will depend upon the particular silanated polymer chosen. In any case, enough of the silanated polymer is desirably included so that at least a minimal improvement in strength, water and stain resistance can be seen in the resulting grout compositions, but not so much as to detrimentally impact any other desirable properties or characteristics thereof. In light of these considerations, and very generally speaking, silanated polymers, e.g. silanated acrylic latexes, are desirably included in the present grout compositions in total amounts ranging from about 8 wt % to about 40 wt %, or from about 10 wt % to about 30 wt %, and in certain embodiments, from about 10 wt % to about 20 wt %.

In addition to the silanated polymer, the present grout compositions may further comprise an amount of an acrylic dispersion, such as an acrylic/poly urethane dispersion. The inclusion of such a dispersion can further enhance the water and/or stain resistance of the grout compositions as may be desirable in extremely wet applications. Preferably, if such a dispersion is to be utilized, it will be stabilized hybrid dispersion with enhanced interaction between the urethane and acrylic moieties, rather than a simple blend. Many such stabilized hybrid dispersions are commercially available, with but a few examples of these being any of those available under the trade designations Hybridur® (Air Products and Chemicals Inc., Allentown, Pa.) or NeoPac® (grades E125 and E114, NeoResins, Wilmington, Mass.). If desirably included in the present grout compositions, the dispersions are suitably utilized in amounts ranging from about 1 wt % to about 15 wt %, or from about 2 wt % to about 10 wt %, or even from about 3 wt % to about 5 wt %.

As discussed above, the inventive one-part polymer grout compositions comprising a silanated polymer are surprisingly strong, e.g., capable of meeting, or even exceeding the standards for flexural and tensile strength provided by the American National Standard Specifications for standard cement grouts, as well as achieving a residential installation rating under ASTM C627-76. The grout compositions are yet also surprisingly water and stain resistant, capable of meeting or even exceeding these standards for cement grouts provided by the American National Standard Specifications. As such, the present grout compositions provide significant advancement to the construction and home improvement industries, while even providing a potential cost and time savings in their application and use.

Yet, the present one-part polymer grouts may be even further enhanced in order to provide additional advantages in their use and application. For example, the present grout compositions may include amounts of fiber fillers, that can not only improve the cohesiveness of the grout compositions upon drying so that visual cracking can be minimized or eliminated, but also, may render the grout compositions tintable at a point of sale, as described in commonly assigned co-pending patent application Ser. No. 10/729,630, filed on Dec. 5, 2003, incorporated by reference herein in its entirety and for all purposes.

Fibers of any material are believed to be capable of providing at least some amount of rheology modification and/or mixing facilitation, or assist in shrinkage/crack resistance, and many types of fiber fillers are known and commercially available. Mineral fillers, for example, are commercially available under the trade designations Nyad® G or Wollastocoat® (Nyco, Calgary, Alberta, Canada) or MS605 Roxul 1000 (Lapinus Fibres BV, Roermond, Netherlands), while one example of a commercially available cellulose fiber filler is that having the trade name Arbocel® (all grades) from J. Rettenmaier USA, Schoolcraft, Mich. Any of these, or any other commercially available fiber filler comprising any material, may be utilized alone or in combination in the present grout compositions if enhanced shrinkage and/or crack resistance is desired.

As is recognized by those of ordinary skill in the art, the amount of any such fiber filler(s) utilized will depend at least in part on the particular fiber filler chosen. Of course, the total amount of fiber filler utilized will desirably be enough to least minimally assist in tint dispersion throughout the grout compositions, but yet not so much as to detrimentally impact any other desirable properties thereof. Generally speaking, amounts of mineral fibers, when used alone, ranging from about 0.1 to about 20 wt %, or from about 1 wt % to about 10 wt %, or even from about 2 wt % to about 6 wt % can provide the desired rheology modification or other assistance in tint dispersion. Cellulose fibers in amounts ranging from about 0.05 wt % to about 2 wt %, or 0.1 wt % to about 1 wt %, or from about 0.2 wt % to about 0.9 wt % are believed to be capable of imparting at least minimal improvement in tint dispersion in the present grout compositions. Combinations of fillers comprising a variety of materials may be used, and if the same is desired, each type of fiber may be included in the combination in an amount according to the ranges provided herein. Generally speaking, the fiber fillers can be provided in an amount of at least about 25 wt %, or in an amount of at least about 30 wt %, such amounts based upon the total weight of the grout composition.

Although the grout compositions are believed to be substantially water and/or stain resistant merely due to the inclusion therein of a silanated polymer, the stain resistance of the present grout compositions may also be further enhanced. In applications where such enhancement in the properties is desired, e.g. as may be the case for extremely wet application sites, in application sites where mold and mildew are otherwise known to proliferate, or application sites where contact with stain causing agents may be anticipated, the present grout compositions may further comprise effective amounts of anti-microbial and/or stain resistance additives. The commercial market is replete with such agents, and any of these may be used to further optimize the stain resistance of the present grout compositions.

Zinc oxide is one example of a generic antimicrobial agent available from any of a number of sources, while other examples of antimicrobial agents include barium metaborate (Revelli, Chemicals, Inc., Greenwich, Conn.), Kathon® LX (Rohm & Haas, Philadelphia, Pa.) zinc omadine and sodium omadine (Arch Chemicals, Inc, Norwalk Conn.) trichlosan (Ciba Specialty Chemicals, Basel Switzerland) or Troysan® 174 and Troysan® P20T (Troy Corporation, Florham Park, N.J.). Suitable amounts of these will vary according to the particular antimicrobial agent chosen, but in each instance, suitable amounts are well known to those of ordinary skill in the art, and further may be available from the respective suppliers of each. Generally speaking then, zinc oxide and barium metaborate may be included in the present grout compositions in amounts ranging from about 1 wt % to about 20 wt %, from about 3 wt % to about 15 wt % or even from about 5 wt % to about 10 wt %, while zinc and sodium omadine and trichlosan may be included, if desired, in amounts ranging from about 0.05 wt % to about 5 wt %, from about 0.1 wt % to about 4 wt % or from about 0.15 wt % to about 1 wt %.

Commercially available stain resistance additives include, but are not limited to, Teflon powders, such as Zonyl® MP1200 from DuPont; silicone/silane/siloxane emulsions including BS45 or BS1306 from Wacker Silicones, Adrian, Mich.; fluoropolymers emulsions like APG3312 from Advanced Polymer, Inc., Carlstadt, N.J.; fluorinated silicone emulsions such as Visil FSE from Vitech International Inc., Janesville, Wis.; wax dispersions such as Aquabead® 325E from Micro Powders, Tarrytown, N.Y.; and polyurethane dispersions such as NeoResR9649 or 9699 also from Neoresins. Useful amounts of each of these stain resistance additives are well known and/or readily available, and generally speaking can range from about 0.5 wt % to about 10 wt %, about 1 wt % to about 6 wt %, or from about 1.5 wt % to about 4 wt % for the Teflon powders and wax dispersions. Silicone/silane/siloxane emulsions, fluoropolymer emulsions and fluorinated silicone emulsions may be utilized, when desired, in amounts ranging from about 1 wt % to about 20 wt %, or from about 2 wt % to about 15 wt % or even from about 3 wt % to about 10 wt %. The acrylic/polyurethane dispersions can be provided in amounts ranging from about 1 wt % to about 15 wt %, from about 2 wt % to about 10 wt %, or from about 3 wt % to about 5 wt %. Finally, suitable amounts of polyurethane dispersions can range from about 0.5 wt % to about 6 wt %, from 0.6 wt % to about 4 wt %, 0.8 wt % to about 1.5 wt %.

Although expected to be uniformly tintable via the inclusion of one or more fiber fillers, the tintability of the grout compositions may be further enhanced via the inclusion therein of one or more rheology modifiers, surfactants and/or dispersants. Many rheology modifiers are known and commercially available and any of these may be used in the present grout compositions. For example, "Rheology Modifiers Handbook: Practical Use and Application", David R. Braun and Meyer R. Rosen, William Andrews Publishing, New York, N.Y., 2001, describes many commercially available rheology modifiers, as well as selection procedures and formulations thereof, and is hereby incorporated by reference herein in its entirety for all purposes. Generally, rheology modifiers may be comprised of acrylic polymers; cross-linked acrylic polymers; alginates; associative thickeners; carrageenan; cellulose derivatives, including, but not limited to, microcrystalline cellulose, carboxymethylcellulose sodium, hydroxyethylcellulose, hydroxypropylcellulose, and methylcellulose; guar and guar derivatives; locust bean gum; organoclays and other clays; polyethylene oxide; polyethylene; polyvinyl pyrrolidone silica; xanthan gum; or combinations of these.

But a few examples of commercially available rheology modifiers that may be suitable for use in the present grout compositions include any or all of the grades available under the trade names Carbopol® (Noveon Inc., Cleveland, Ohio); Cab-O-Sil® (all grades, Cabot Corp., Tuscola, Ill.); Aerosil® (all grades, Degussa, Piscataway, N.J.); Bermocoll® (all FQ grades, Akzo Nobel Stenungsund, Sweden); Cellosize® (all grades, The Dow Chemical Co., Midland, Mich.); Tylose® (all grades, Clariant Corp., Charolette, N.C.); Acrysol® (all grades, Rohm & Haas, Philadelphia, Pa.) and Attagel® (all grades Engelhard, Iselin, N.J.).

Amounts of the rheology modifiers will depend not only on the particular rheology modifier used, but also on the desired effect of the same. That is, while rheology modifiers may surprisingly result in the present grout compositions being tintable at a point of sale, this may not be desired or required in all instances. Bearing this is mind, in those embodiments where the addition of rheology modifiers results in a sanded grout composition according to the present invention being tintable at a point of sale, the amount of rheology modifiers included will desirably be capable of providing a reduction in viscosity of at least about 35%, or about 40%, or even at least about 50%, so that the tinting agent may be uniformly dispersed within the grout composition. For any other purpose, very generally speaking then, polymeric and cellulosic rheology modifiers may generally be included in the present grout compositions in amounts ranging from about 0.05 to about 2 weight percent, in some embodiments from about 0.1 to about 1.5 wt % and in yet other embodiments, from about 0.2 wt % to about 1 wt %, based upon the total weight of the grout composition, while fumed silica and clay rheology modifiers may suitable be included in the grout compositions in amounts ranging from about 0.05 wt % to about 5 wt %, in some embodiments from about 0.1 wt % to about 4 wt %, and in yet other embodiments from about 0.5 wt % to about 3 wt %.

One or more surfactants and/or dispersants may also desirably be included in the present grout compositions as may be desired to assist not only in the uniform dispersion of the tint throughout the grout composition upon shaking, but also to assist in the stability of the tint within the grout composition once so uniformly dispersed. Many dispersants and surfactants suitable for use in conventional compositions are known and any of these may be used in the present tintable grout compositions. A few examples of commercially available dispersants include those provided under the trade designations Colloid 211 (Rhodia USA, Cranbury, N.J.), Sokalan® CP13S (BASF Inc. Charlotte, N.C.) and Tamol® 731 (Rohm & Haas), while examples of commercially available surfactants include, but are not limited to, those provided under the trade designations T-Det® N407 and Triton® X100 (Harcros Chemicals, Inc., Kansas City, Kans. and Rohm and Haas, respectively).

As is understood by those of ordinary skill in the art, the amount of surfactant and/or dispersant utilized will depend upon the particular surfactant and/or dispersant selected. Desirably, the amounts utilized will at least minimally assist in the uniform dispersion of a tint within the grout composition, as well as the stability of the tint within the grout composition once so dispersed, but not so much as to substantially detrimentally impact other desirable properties of the grout compositions. Bearing these considerations in mind, and very generally speaking, useful amounts of dispersants are expected to range from about 0.1 wt % to about 3 wt %, or from about 0.2 wt % to about 2 wt %, or even from about 0.5 wt % to about 1.5 wt %. Similarly, useful amounts of surfactants are expected to range from about 0.2 wt % to about 2 wt %, or from about 0.4 wt % to about 1.5 wt % or even from about 0.5 wt % to about 1 wt %.

The present grout composition may further comprise any of the components otherwise found in conventional one-part polymer grout compositions. In addition to the fiber fillers, as may be provided to optionally impart enhanced shrinkage and/or crack resistance, or stain resistant additives or anti-microbial agents as may optionally be provided to enhance stain resistance, or rheology modifiers that may optionally be included to render the grout compositions tintable, the present grout compositions may include such conventional components as fillers, solvents, humectants, plasticizers, preservatives, defoamers, adhesions promoters, pH modifiers, freeze-thaw stabilizers, anti-settling agents, etc. If desirably included, each of these may advantageously be utilized in amounts typically utilized in conventional one-part polymer grout compositions, as may be readily determined by those of ordinary skill in the art and/or as may be provided by the supplier of each.

Other fillers, in addition to any fiber fillers and/or other rheology modifiers, may optionally be utilized in the present grout compositions to, e.g., impart desired application characteristics. Those of ordinary skill in the art are familiar with such fillers, commercial sources of the same, and amounts in which to use them to achieve whatever their desired effect. Glass bubbles, for example, may be included to increase coverage abilities to the present grout compositions and are commercially available under the trade names Scotchlite® and Q-cell® (all grades of each, from 3M, Maplewood, Minn. and PQ Corporation, Valley Forge, Pa., respectively). Ceramic microspheres may be included in the present grout composition for similar purposes and trade names of a few commercially available examples of the same include Fillite®500 (Trelleborg Fillite, Ltd., Norcross, Ga.), Zeospheres G600 (3M) and Extendospheres™ SG, (PQ Corporation). Silica sand is a common filler that may also be utilized to alter the application characteristics of the grout compositions, to assist in tint dispersion, and/or to improve the strength of the grout compositions, when desired. All fine or medium grades commercially available from Fairmont Minerals, Wedron, Ill. and U.S. Silica, Ottawa, Ill. are suitable for such purposes. Finally, calcium carbonate may desirably be added as a fine filler in the grout compositions, and is particularly useful in those instances wherein the present water, stain and crack resistant grout compositions are desirably also tintable. Calcium carbonate is available generically from a number of chemical manufactures.

As mentioned above, those of ordinary skill in the art are well aware, and/or well equipped to calculate, suitable amounts of such fillers. Generally speaking then, glass bubbles and ceramic microspheres may be included in the present grout compositions, if desired, in amounts ranging from about 0.5 wt % to about 10 wt %, in certain embodiments from about 1 wt % to about 8 wt %, and in yet other embodiments from about 2 wt % to about 6 wt %. Silica may be utilized, if desired, in the present grout compositions in amounts from about 20 wt % to about 60 wt %, in other embodiments, about 25 wt % to about 50 wt %, and in yet other embodiments, from about 30 wt % to about 45 wt %. Finally, in those embodiments of the grout compositions wherein it may be desirable to include calcium carbonate, suitable amounts can range from about 5 wt % to about 50 wt %, in other embodiments from about 10 wt % to about 40 wt %, and in yet other embodiments from about 15 wt % to about 30 wt %.

Solvents may also be optionally included in the present grout compositions, as may be required or desired to provide improved application characteristics and/or to further improve crack and/or shrinkage resistance. Solvents useful in one-part polymer grout compositions are well-known, and include water, mineral spirits (generically available from many sources) and other organic solvents. Two commercially available examples of suitable solvents include Texanol® and butyl cellosolv (Eastman Chemical Company, Kingsport, Tenn., and The Dow Chemical Company, respectively). Any solvents desired will be used in any amount required to achieve the desired effect as may be readily determined by those of ordinary skill in the art. The exemplary solvents are expected to be suitable in amounts ranging from about 0.1 wt % to about 5 wt %, or from about 0.5 wt % to about 3 wt %, or even from about 1 wt % to about 2 wt %.

Likewise, humectants and plasticizers are well known to those of ordinary skill in the art, and may be utilized in the present grout compositions as appropriate or desired. Many humectants and plasticizers are known and are commercially available generically. For example, neopentyl glycol and urea are two well known humectants, widely commercially available from a variety of sources, while Benzoflex® 50 (Velsicol Chemical Company, Rosemount, Ill.) is but one example of a plasticizer suitable from use in the present grout compositions, if desired. Suitable amounts, as well known to those or ordinary skill in the art, of these will of course depend upon the particular humectant or plasticizer chosen, but generally speaking, will range from about 0.1 wt % to about 3 wt %, or from about 0.2 wt % to about 2 wt %, or even from about 0.5 wt % to about 1.5 wt %.

The present strong, water and stain resistant grout compositions may be prepared according to any known method of preparing one-part polymer grout compositions systems, and the particular methodology employed is not critical. For example, the desired components may simply be placed in an appropriate container in appropriate amounts and mixed until a substantially uniform grout composition is achieved. Particular non-limiting examples of sanded grout compositions embodying features of the present invention, as well as the methods of preparing the same, are provided below at Examples 1 and 2, while one exemplary embodiment of an unsanded grout composition in accordance with the present invention and method of its preparation is provided at Example 3.

The following test procedures are suitable for use in the following examples:

Water resistance will be tested by immersing a 1 in diameter disk, ¼" thick of dried grout in water and visually monitoring the impact of the water immersion at regular time intervals. Sample may also be tested for hardness or strength after the period of immersion. Water resistance may also be measured and evaluated according to the American National Standard Specifications for standard and polymer modified cement grouts, ANSI A118.6 and A118.7.

Shrinkage/Crack resistance will be measured by applying the grout compositions to joint spaces up to ¼" wide, allowing the grout to dry and recording any visually apparent cracks or sinking at joint intersections that occur(s).

Stain Resistance will be measured and evaluated according to the Ceramic Tile Institute Stain Test CTI-T-72, but modified to include additional staining materials (beyond what is specified in the procedure). Grout compositions scoring an average of 2 or lower are considered stain resistant according to this method.

Tensile Strength will be measured and evaluated according to the American National Standard Specifications for standard and polymer modified cement grouts, ANSI A118.6 and A118.7, using a ¼" dog bone sample rather than the specified sample size.

Flexural Strength will be measured and evaluated according to the American National Standard Specifications for standard and polymer modified cement grouts, ANSI A118.6 and A118.7, using a ¼"x¼" bar sized sample rather than the specified sample size.

Installation performance was measured and rated according to ASTM Method 627-76 Evaluating Ceramic Floor Tile Installation Systems.

Shore A hardness was measured using a Shore A durameter. If the indenter completely penetrates the sample, a reading of 0 is obtained, and if no penetration occurs, a reading of 100 results. Samples capable of achieving an average Shore A hardness reading of at least about 50, or at least about 60, or even at least about 75 after being submerged in water for 7 days, are considered to be "water resistant" as that term is used herein.

EXAMPLE 1

A sanded grout composition embodying certain aspects of the present invention was prepared according to the following Formula I by adding the components, in the order and amounts listed, to an appropriate mixing container:

| Formula I | |
|---|---|
| Component | Amount (g) |
| Water | 24.6 |
| T-DET ® N-407 (surfactant) | 8.5 |
| Ethylene glycol | 19 |
| Colloid 211 (dispersant) | 2.5 |
| Triethanolamine | 3.3 |
| Rhoximat ® DS 931 (silanated styrene acrylic latex) | 190 |
| Mineral Spirits | 10 |
| Wollastocoat ® treated Nyad ® G (surface modified wollastonite fiber) | 49.8 |
| Arbocel ® B400 (cellulose fiber) | 6.0 |
| Lapinus MS605Roxul1000 (Rock wool fiber) | 30.0 |
| Atomite ® (calcium carbonate) | 227.8 |
| Tylose ® H2OP2 (cellulose) | 2 |
| Troysan ® 174 (bactericide) | 2 |
| Troysan ® P20T (fungicide) | 0.5 |
| NXZ (defoamer) | 1.5 |
| Scotchlite ® S60/10000 (glass filler) | 36.5 |
| Sokalan ® CP135 (dispersant) | 5 |
| Water | 5.4 |
| Silane A1106 (adhesion promoter) | 2 |
| NXZ | 2 |
| Wedron ® 720 (sand) | 206.1 |
| F-55 (sand) | 157.5 |
| NXZ | 1.5 |
| Water | 6.5 |
| Total | 1000.00 |

The above components were added to a container in the order recited and mixed after each addition with a KitchenAid mixer for at least one minute, with the exception that after the addition of the fibers (Wollastocoat®, Arbocel® and Lapinus), the mixture was mixed for at least about 5 minutes.

The resulting grout composition had a measured viscosity of 700,000. Surprisingly and advantageously, this embodiment of the inventive grout compositions met the water absorption, tensile strength, and flexural strength property requirements for standard cement grout. More particularly, this particular grout composition had the following properties as measured by ANSI118.6:

| Property | Requirement for standard cement grout | Measured property of polymer grout according to formula I |
| --- | --- | --- |
| Water absorption | | |
| 50% humidity to immersion | <10% | 6.9% |
| Immersion to dry | <12% | 3.1% |
| Tensile Strength (28 days) | 350 psi minimum | 543.8 psi |
| Flexural Strength (7 days) | 350 psi minimum | 419.6 |
| Stain resistance | No requirement, typical cement grouts average 4.5–5 | Average <2 |

This particular grout composition also showed no visible shrinkage or cracking when applied to ¼" joint spaces. The grout composition was also determined to be stain resistant, scoring an average rating of <2 on the Ceramic Tile Institute Stain Test CTI-T-72. Finally, this grout achieved an installation performance rating of "Residential" according to ASTM 627-76.

EXAMPLE 2

A sanded grout composition embodying certain aspects of the present invention was prepared according to the following Formula II by adding the components, in the order and amounts listed, to an appropriate mixing container:

| Formula II | |
| --- | --- |
| Component | Amount (g) |
| Water | 24.6 |
| T-DET ® N-407 (surfactant) | 8.5 |
| Ethylene glycol | 19 |
| Colloid 211 (dispersant) | 2.5 |
| Triethanolamine | 3.3 |
| Rhoximat ® DS 931 (latex) | 190 |
| Mineral Spirits | 10 |
| Wollastocoat ® treated Nyad ® G (surface modified wollastonite fiber) | 49.8 |
| Arbocel ® B400 (cellulose fiber) | 6.0 |
| Lapinus MS605Roxul1000 (Rock wool fiber) | 30.0 |
| Zinc oxide | 213.4 |
| Tylose ® H2OP2 (cellulose) | 2 |
| Troysan ® 174 (bactericide) | 2 |
| Troysan ® P20T (fungicide) | 0.5 |
| NXZ (defoamer) | 1.5 |
| Scotchlite ® S60/10000 (glass filler) | 36.5 |
| Sokalan ® CP135 (dispersant) | 5 |
| Water | 5.4 |
| Silane A1106 (adhesion promoter) | 2 |
| NXZ | 2 |
| Wedron ® 720 (sand) | 206.1 |
| F-55 (sand) | 157.5 |
| PT 5700 (titanium dioxide) | 14.4 |
| NXZ | 1.5 |
| Water | 6.5 |
| Total | 1000.00 |

The above components were added to a container in the order recited and mixed after each addition with a KitchenAid mixer for at least one minute, with the exception that after the addition of the fibers, (Wollastocoat®, Arbocel® and Lapinus), the mixture was mixed for at least about 5 minutes.

The resulting grout composition is expected to have a measured viscosity of 625,000 cps, and is further expected to meet the water absorption, tensile strength, and flexural strength property requirements for standard cement grout.

EXAMPLE 3

An unsanded grout composition embodying certain aspects of the present invention was prepared according to the following Formula III by adding the components, in the order and amounts listed, to an appropriate mixing container:

| Formula III | |
| --- | --- |
| Component | Amount (g) |
| Water | 7.5 |
| T-DET ® N-407 (surfactant) | 6 |
| Ethylene glycol | 17 |
| Colloid 211 (dispersant) | 2.5 |
| Triethanolamine | 3 |
| Water | 13 |
| Rhoximat ® DS 931 (latex) | 300 |
| Mineral Spirits | 30 |
| Lapinus MS605Roxul1000 (Rock wool fiber) | 30 |
| FIC200 (cellulose fiber) | 20 |
| Atomite ® (calcium carbonate filler) | 430 |
| Tylose ® H2OP2 (cellulose) | 2 |
| Water | 24 |
| Silane A1106 (adhesion promoter) | 2 |
| Troysan ® 174 (bactericide) | 2 |
| Troysan ® P20T (fungicide) | 0.5 |
| NXZ (defoamer) | 1.5 |
| Scotchlite ® S60/10000 (glass filler) | 36.5 |
| Sokalan ® CP135 (dispersant) | 5 |
| Water | 5.4 |
| PT 5700 (titanium dioxide) | 10 |
| Scotchlite ® S60/10000 | 87.5 |
| NXZ | 3 |
| Water (optional) | 10 |
| Total | 1000.00 |

The above components were added to a container in the order recited and mixed after each addition with a KitchenAid mixer for at least one minute, with the exception that, after the addition of the fibers (Arbocel® and Lapinus), the mixture was mixed for at least about 5 minutes.

The resulting unsanded grout composition is expected to have a measured viscosity of 100,000 cps.

COMPARATIVE EXAMPLE 1

The grout compositions according to Formulas I and II, above, were tested according to ANSI 118.6 for water absorption, along side of three commercially available one-part grout compositions, Premix Ceramic Tile Adhesive and Grout, sanded and unsanded, commercially available from Tile Perfect, Aurora, Ill. and Custom Pre-Mixed Tile Grout, commercially available from Custom Building Products, Seal Beach, Calif. Two samples of each grout composition were tested. The results of this comparison are provided below in Table 3

TABLE 3

| Sample | Cure to Immersion | Immersion to Dry |
|---|---|---|
| Standard sanded cement grout requirement | <10% | <12% |
| Standard unsanded cement grout, requirement | <18% | <20% |
| Formula I, sample A | 5.1% | 5.24% |
| Formula I, sample B | 5.11% | 5.27% |
| Formula II, sample A | 3.42% | 4.97% |
| Formula II, sample B | 3.38% | 4.93% |
| Tile Perfect, unsanded, sample A | 22.19% | 13.48% |
| Tile Perfect, unsanded, sample B | 22.6% | 14.41% |
| Tile Perfect, sanded, sample A | 7.66% | 5.35% |
| Tile Perfect, sanded, sample B | 7.51% | 5.18% |
| Custom, sample A | 12.59% | 13.01% |
| Custom, sample B | 13.27% | 13.71% |

As can be seen, two of the commercially available one-part polymer grouts, although not unexpectedly, did not meet the ANSI requirement for standard sanded cement grout, and none performed as well as exemplified grout compositions according to Formulas I and II. Additionally, sample disks 1" diameter and ¼" thick were prepared of each sample and were soaked in water for 10 days. Formula I and Formula II samples were still hard, having Shore A hardness values ranging from 50 to about 100 while competitive products were soft, have a Shore A reading of 0. In fact, the Tile Perfect samples had a Shore A reading of 0 even prior to being submerged in water.

COMPARATIVE EXAMPLE 2

The grout composition according to Formula I was tested for uniform and stable tintability along side of six commercially available one-part polymer grout compositions: Custom unsanded (Custom Building Products, Seal Beach, Calif.); Ace unsanded one part polymer grout (Ace Hardware Stores, nationwide); TilePerfect, both sanded and unsanded (TilePerfect, Aurora, Ill.); and Mapei sanded and unsanded (Mapei, Deerfield, Fla.).

More specifically, each of the samples were tinted with DeGussa Colortrend 888 tints according to the formulations 3E+3V (³⁄₄₈$^{th}$ oz phthalo blue and ³⁄₄₈$^{th}$ oz magenta to provide purple); 3T+3R (³⁄₄₈$^{th}$ oz medium yellow and ³⁄₄₈$^{th}$ oz organic red to provide orange) and 2D+6E+2T (²⁄₄₈$^{th}$ oz phthalo green, ⁶⁄₄₈$^{th}$ oz phthalo blue and ²⁄₄₈$^{th}$ oz medium yellow to provide blue/green). Tints were dispensed with a 22PD automatically dispensing tint dispenser (Fluid Management, Inc.), and the tinted grout agitated utilizing either a Miller Model G paint shaker, or a Harbil 5G HD, depending on the type of container. That is, the Miller paint shaker is suitable for metal cans, whereas the Harbil can accept only plastic containers. All samples were shaken for 3 minutes, turned over and shaken for another 3 minutes.

The samples were then tested for color dispersion and tint stability, as described above. The results are provided in the tables below.

| Color Dispersion | | | |
|---|---|---|---|
| Sample | Orange | Purple | Green |
| Formula I, above | 0.05 | 0.19 | 0.29 |
| Custom (unsanded) | 0.05 | 0.13 | 1.66 |
| Ace (unsanded) | 0.12 | 0.28 | 6.67 |
| TilePerfect (unsanded) | 2.87 | 5.77 | 4.65 |
| TilePerfect (sanded) | 2.83 | 3.56 | 16.95 |
| Mapei (unsanded) | 3.66 | 12.12 | 11.48 |
| Mapei (sanded) | 3.97 | 7.42 | 4.52 |
| TA 680 Colorlastec | 0.11 | 0.06 | 0.12 |

| Tint Stability | | | |
|---|---|---|---|
| Sample | Orange | Purple | Green |
| Formula I, above | No visible separation | No visible separation | No visible separation |
| Custom (unsanded) | Visible separation of tints on the surface | Visible separation of tints on the surface | Visible separation of tints on the surface |
| Ace (unsanded) | Visible separation of tints on the surface | Visible separation of tints on the surface | Visible separation of tints on the surface |
| TilePerfect (unsanded) | Visible separation of tints on the surface | Visible separation of tints on the surface | Visible separation of tints on the surface |
| TilePerfect (sanded) | No visible separation | No visible separation | No visible separation |
| Mapei (unsanded) | No visible separation | No visible separation | No visible separation |
| Mapei (sanded) | No visible separation | No visible separation | No visible separation |
| TA 680 Colorlastec | No visible separation | No visible separation | No visible separation |

Additionally, the Formula I grout composition and the six competitive samples were tested for shrinkage/crack resistance by applying the grout compositions to joint spaces up to ¼" wide, allowing the grout to dry and recording any visually apparent cracks or sinking at joint intersections that occur(s). The results of this testing are provided below. Generally speaking, none of the six commercially available products are capable of being applied in joint spaces larger than ⅛" of without shrinkage or cracking.

| Shrinkage/Crack Resistance | | |
|---|---|---|
| Sample | ⅛" joints | ³⁄₁₆" joints |
| Formula I, above | No visible shrinking/cracking | No visible shrinking or cracking |
| Custom (unsanded) | Visible shrinking, cracking and pinhole formation | Visible shrinking, cracking and pinhole formation |
| Ace (unsanded) | Visible shrinking, cracking and pinhole formation | Visible shrinking, cracking and pinhole formation |
| TilePerfect (unsanded) | Pinholes | Significant shrinkage |
| TilePerfect (sanded) | Pinholes | Significant shrinkage |
| Mapei (unsanded) | Pinholes | Visible shrinkage and cracking |
| Mapei (sanded) | Pinholes | Visible shrinkage and cracking |

-continued

| Shrinkage/Crack Resistance | | |
|---|---|---|
| Sample | ⅛" joints | 3/16" joints |
| TA 680 Colorlastec | Pinholes | Visible shrinkage and cracking |

As is shown, only the grout composition according to formula I and TA 680 Colorlastec (no longer commercially available from HBFuller) could be both uniformly and stably tinted. However, only the grout composition of Formula I is also shrinkage/crack resistant as defined herein.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A one-part polymer grout composition comprising a silanated polymer in an amount effective to render the dried grout composition substantially water resistant.

2. The one-part polymer grout composition of claim 1, wherein the silanated polymer comprises an acrylic latex.

3. The one-part polymer grout composition of claim 2, wherein the silanated polymer comprises a modified acrylic latex.

4. The one-part polymer grout composition of claim 3, wherein the silanated polymer comprises a silanated styrene acrylic latex.

5. The one-part polymer grout composition of claim 4, wherein the silanated styrene acrylic latex comprises from about 5 weight % to about 40 weight % based upon the total weight of the grout composition.

6. The one-part polymer grout composition of claim 5, wherein the silanated styrene acrylic latex comprises from about 8 weight % to about 30 weight % based upon the total weight of the grout composition.

7. The one-part polymer grout composition of claim 6, wherein the silanated styrene acrylic latex comprises from about 10 weight % to about 20 weight % based upon the total weight of the grout composition.

8. The one-part polymer grout composition of claim 1, wherein the grout composition once applied and dried can provide a Shore A hardness of at least about 50 after being submerged in water for seven days.

9. The one-part polymer grout composition of claim 8, wherein the grout composition once applied and dried can provide a Shore A hardness of at least about 60 after being submerged in water for seven days.

10. The one-part polymer grout composition of claim 9, wherein the grout composition once applied and dried can provide a Shore A hardness of at least about 75 after being submerged in water for seven days.

11. The one-part polymer grout composition of claim 4, further comprising an amount of one or more fiber fillers effective to render the grout composition substantially shrinkage and/or crack resistant once applied to a substrate and dried.

12. The one-part polymer grout composition of claim 11, wherein the fiber fillers are provided in an amount of at least about 25 wt %, based upon the total weight of the grout composition.

13. The one-part polymer grout composition of claim 12, wherein the fiber fillers are provided in an amount of at least about 30 wt % based upon the total weight of the grout composition.

14. The one-part polymer grout composition of claim 1, wherein the grout composition is also substantially stain resistant once applied and dried.

15. The one-part polymer grout composition of claim 14, further comprising one or more stain resistance additives or antimicrobial agents.

16. The one-part polymer grout composition of claim 14, wherein the grout composition can provide a stain resistance value of at least about 2 or less, as measured and evaluated by Ceramic Tile Institute Stain Test CTI-T72.

* * * * *